United States Patent [19]

Brewbaker et al.

[11] Patent Number: 5,037,938
[45] Date of Patent: Aug. 6, 1991

[54] THERMOTROPIC COPOLYMERS OF 4,4'-BIPHENYLDICARBOXYLIC ACID

[75] Inventors: James L. Brewbaker; William B. Marshall, both of Midland, Mich.

[73] Assignee: The Dow Chemical Company, Midland, Mich.

[21] Appl. No.: 356,492

[22] Filed: May 25, 1989

[51] Int. Cl.[5] ............... C08G 63/02; C08G 63/00
[52] U.S. Cl. ............... 528/193; 528/176; 528/190; 528/194; 528/271; 528/272
[58] Field of Search ............... 528/176, 190, 193, 194, 528/271, 272

[56] References Cited

U.S. PATENT DOCUMENTS 4,337,191  6/1982  Favstritsky .
4,447,593  5/1984  Funakoshi et al. ............... 528/176

FOREIGN PATENT DOCUMENTS 91721    5/1983  Japan .
151-156  3/1987  Japan .

Primary Examiner—Harold D. Anderson
Assistant Examiner—T. Mosley

[57] ABSTRACT

The invention relates to a class of polyesters and copolyesters which display optical anisotropy in the molten state and to the shaped articles, fibers and films obtained from the optically anisotropic melts. The copolyesters consisting essentially of recurring structural units (a) independently each occurrence selected from the group consisting essentially of Formula I; recurring structural units (b) independently each occurrence selected from the group consisting of Formulas II and III; recurring structural units (c) independently each occurrence selected from the group consisting of Formula IV and optionally recurring structural units (d) independently each occurrence selected from the group consisting of Formula V:

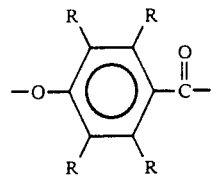

I

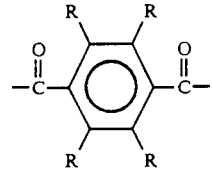

II

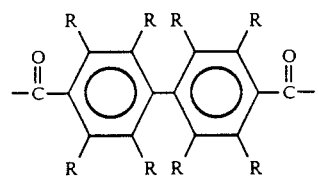

III

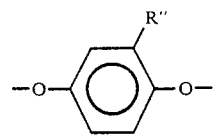

IV

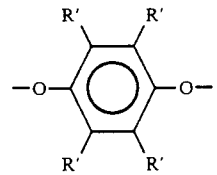

V wherein R independently each occurrence is selected from the group consisting of hydrogen, halo, lower alkyl, methoxy and phenyl; R' independently each occurrence is selected from the group consisting of hydrogen, halo, methoxy and phenyl; and R" comprises lower alkyl.

5 Claims, No Drawings

THERMOTROPIC COPOLYMERS OF 4,4′-BIPHENYLDICARBOXYLIC ACID

FIELD OF THE INVENTION

The invention relates to a class of copolyesters which display optical anisotropy in the molten state and to the shaped articles, fibers and films obtained from the optically anisotropic melts.

BACKGROUND OF THE INVENTION

Liquid crystalline polymers (LCPs) are macromolecules possessing significant orientation in either the molten state or in concentrated solution. The state of their solution (lyotropic) or melt (thermotropic) is between the boundaries of solid crystals and isotropic liquids. In the solid state these highly ordered polymers display exceptional strength properties in the direction of orientation. By designing molecules containing only relatively inert chemical bonds, preparation of thermally and oxidatively stable high-performance materials is possible.

A review of thermotropic LCPs can be found in Kwolek et al., "Liquid Crystalline Polymers", *Encyclopedia of Polymer Science and Engineering* 2nd Ed, Vol. 9, pp 23–55 (1987). Among those listed are polyesters. Many liquid crystalline polyesters display several of the desirable attributes of these compounds. Unfortunately, most have too high of a melt temperature for economical melt fabrication.

There is a growing need in the thermoplastic engineering industries to provide for new and improved polyesters and copolyesters which possess a high degree of processability while concurrently exhibiting superior mechanical properties.

SUMMARY OF THE INVENTION

The invention concerns copolymers capable of forming an optically anisotropic melt consisting essentially of recurring structural units (a) independently each occurrence selected from the group consisting of Formula I; recurring structural units (b) independently each occurrence selected from the group consisting of Formulas II and III; recurring structural units (c) independently each occurrence selected from the group consisting of Formula IV and optionally recurring structural units (d) independently each occurrence selected from the group consisting of Formula V:

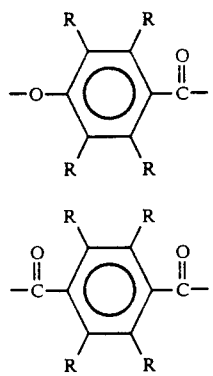

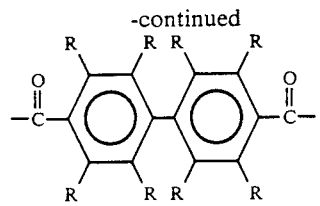

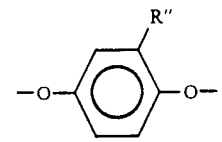

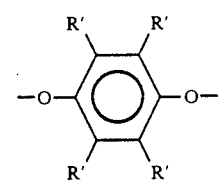

wherein R independently each occurrence is selected from the group consisting of hydrogen, halo, lower alkyl, methoxy and phenyl: R′ independently each occurrence is selected from the group consisting of hydrogen, halo, methoxy and phenyl: and R″ comprises lower alkyl.

DETAILED DESCRIPTION

Preferably, R is independently selected from the group consisting of hydrogen, halo, lower alkyl and methoxy. Preferably, R′ is independently selected the group consisting of hydrogen, halo and methoxy. Preferably, R″ comprises normal lower alkyl containing 1 to 4 carbon atoms. More preferably, R and R′ are each occurrence hydrogen. More preferably, R″ comprises methyl, ethyl or propyl. Most preferably, R″ comprises methyl.

In the copolyesters of the invention, the molar percent ranges for independently recurring units of Formulas II and III substantially equal the molar percent ranges for independently recurring units of Formulas IV and V.

Desired molar percent ranges for these copolyesters are from 5 mole percent to 75 mole percent of recurring units of Formula I: from 12.5 mole percent to 47.5 mole percent of independently recurring units of Formulas II and III wherein the ratio of Formula II units to Formula III units varies from 10:90 to 90:10; and from 12.5 mole percent to 47.5 mole percent of independently recurring units of Formulas IV and V wherein the ratio of Formula IV units to Formula V units varies from 100:0 to 10:90.

More preferred molar percent ranges are from 10 mole percent to 67 mole percent of recurring units of Formula I, from 16.75 mole percent to 45 mole percent of independently recurring units of Formulas II and III wherein the ratio of Formula II units to Formula III units varies from 25:75 to 75:25; and from 16.75 mole percent to 45 mole percent of independently recurring units of Formulas IV and V wherein the ratio of Formula IV units to Formula V units varies from 90:10 to 20:80.

The most preferred molar percent ranges are from 25 mole percent to 55 mole percent of recurring units of Formula I, from 22.5 mole percent to 37.5 mole percent of independently recurring units of Formulas II and III wherein the ratio of Formula II units to Formula III units varies from 33:67 to 67:33: and from 22.5 mole percent to 37.5 mole percent of independently recurring units of Formulas IV and V wherein the ratio of Formula IV units to Formula V units varies from 25:75 to 75:25. The preferred copolyesters of the invention melt below 350° C.

The copolymers may be formed by a variety of ester-forming techniques from difunctional organic compounds possessing functional groups which upon polycondensation form the requisite recurring units. For example, the functional groups of the organic aromatic compounds may independently contain carboxylic acid groups or acid halide groups and functional groups reactive therewith such as hydroxyl or acyloxy groups. In a preferred embodiment, the organic reactants comprise lower acyloxy and carboxylic acid functionality. For example, lower acyl esters of 1,4-dihydroxybenzene, 1,4 dihydroxy-2-methylbenzene and 4-hyroxybenzoic acid wherein the hydroxy group is esterified are more preferred as reactants. The lower acyl groups preferably have from 2 to 4 carbon atoms. Most preferably, the acetate esters are used.

The organic compounds may be allowed to react under anhydrous conditions in an inert atmosphere via a melt acidolysis procedure, in a suitable solvent via a solution procedure, or in a heat exchange medium via a slurry polymerization as described in Calundann, U.S. Pat. No. 4,067,852. Additional suitable reaction conditions are described in Schaefgen, U.S. Pat. No. 4,118,372. The teachings of the foregoing U.S. Patents are incorporated herein by reference. A preferable technique is the melt acidolysis technique.

A catalyst may or may not be used in the polymerization process. If one is used, representative catalysts for use in the process include dialkyl tin oxides (e.g., dibutyl tin oxide), diaryl tin oxides, titanium dioxide, alkoxy titanium silicates, titanium alkoxides, Lewis acids, hydrogen halides (e.g., HCl), alkali and alkaline earth metal salts of carboxylic acids (e.g., sodium acetate). The quantity of catalyst utilized typically is from 0.001 to 1 weight percent based upon total reactant weight, and most commonly from 0.01 to 0.2 weight percent. In a preferable embodiment, a catalyst is not used in the preparation thereof.

Liquid crystalline copolyester melts of this invention may be extruded into articles such as fibers which have outstanding strength and stiffness and will maintain their useful properties at elevated temperatures. Such fibers would be useful as tire cords, reinforcement in hoses, cables, conveyor belts or composite structures with matrixes prepared from other resinous materials. Articles may be films formed from the copolyesters which will have excellent solvent and chemical resistance. In addition, they should have low flammability and good electrical insulating properties. They would be useful as cable wrap, electric motor dielectric film and wire insulation. These copolyesters are useful for the manufacture such as by injection molding of shaped articles which possess high strength, stiffness, chemical resistance and low flammability.

Conventional additives and processing aids can be added to the copolyester melts of the invention to improve the properties of articles made therefrom. Examples of additives are oxidation stabilizers: heat stabilizers; ultraviolet light (UV) stabilizers: lubricants; mold release agents; dyes and pigments; fibrous or powdered fillers and reinforcing agents; nucleating agents: and plasticizers.

Examples of oxidation stabilizers and heat stabilizers are halides of metals of group I of the Periodic Table, used alone and used as a mixture with copper (I) halides or sterically hindered phenols in concentrations from 0.001 to 1 weight percent based on the weight of the copolyester composition.

Examples of UV stabilizers are substituted resorcinols, salicylates, benzotriazoles, benzophenones and mixtures of these, which are added, for example, in amounts from 0.001 to 2 weight percent based on the weight of the copolyester composition.

Dyes and pigments are used, for example, in amounts from 0.001 to 5 weight percent based on the weight of the copolyester composition. Examples are nigrosine, titanium dioxide, cadmium sulfide, phthalocyanine dyes, ultramarine blue and carbon black.

Examples of fillers and reinforcing agents are carbon fibers, glass fibers, amorphous silica, calcium silicate, aluminum silicate, magnesium carbonate, kaolin, chalk, powdered quartz, mica and feldspar, which may be present in a concentration from 0.5 to 70 weight percent, based on the total weight of the filled material.

Examples of nucleating agents are talc, calcium fluoride, sodium phenylphosphonate, alumina and finely divided polytetrafluoroethylene. Suitably, the nucleating agent may be present in an amount from 0.001 to 1 percent by weight.

Plasticizers, such as phthalates, hydrocarbon oils and sulfonamides can be added in an amount of from 0.0001 to 20 weight percent, based on the weight of the composition.

Also included in the composition of the invention, in addition to or in partial replacement of the reactants of Formulas I, II, III, IV, or V are amounts of other aromatic polymerizable units whose presence do not interfere with the excellent mechanical properties of these copolyesters. Examples of such aromatic units comprising these additional repeating units are isophthalic acid, resorcinol, 4,4'-isopropylidenediphenol, 3,4'-biphenyldicarboxylic acid and 3-hydroxybenzoic acid.

Having described the invention, the following examples are provided as further illustrative and are not to be construed as limiting.

The physical characteristics of the copolyesters of the following examples of the invention were measured using standard procedures.

The inherent viscosities of the copolyesters were determined at 45.0° C. using a solution of 0.1 g of polyester in 100 ml of pentafluorophenol. The efflux times of the pure solvent, $t_o$, and of the polyester solution, $t_s$, were determined using a Ubbelohde capillary viscometer. The inherent viscosity, $n_{inh}$, was calculated from the equation, $n_{inh} = \ln(t_s/t_o)/c$, where c is the solution concentration in grams per deciliter (g/dl).

Melt temperature analysis was carried out using differential scanning calorimetry (DSC) on a sample of the polyester at a heating and cooling rate of 20° C. per minute on a Mettler DSC-30 low temperature cell with a Mettler TC10A thermal analysis processor (Mettler Instrument Corp., Hightstown, N.J.).

Thermal mechanical analysis of the polyesters was carried out on a 9900 Thermal Analyzer and TMA Module (E.I. DuPont de Nemours & Co., Wilmington, Del.) at a scan rate of 5° C. per minute using a compression molded disk-shaped pellet 9.3 millimeters (mm) in diameter and 2.5 mm thick.

The apparatus used for determining the optical anisotropy of the copolyesters of the present invention included a THM 600 hot stage, (Linkham Scientific Instruments LTD, Surrey, England) and a Nikon Optiphot Microscope equipped with crossed polarizers and a 35 mm camera (Nikon Instrument Group, Nikon, Inc., Garden City, N.Y.). Observation of a bright field at temperatures above the melting points indicated that the copolyester melts were optically anisotropic.

PREPARATION OF 4-ACETOXYBENZOIC ACID

An amount of 4-hydroxybenzoic acid (92.1 grams (g), 0.67 mole) was dissolved in a solution of sodium hydroxide (NaOH) (53.4 g, 1.33 moles) and 1.33 liters (L) of water in a 4 L beaker. The solution was stirred and cooled to a temperature of 0° C. by adding crushed ice, then acetic anhydride (102.1 g, 1.00 mole) was added. The temperature was maintained at −2° C. for 1 hour by adding one kilogram (Kg) of crushed ice. A solution of concentrated hydrochloric acid (HCl) (144.7 g, 1.42 moles) in 267 milliliters (ml) of water was added. The slurry was stirred briefly and filtered. The product was washed twice by stirring it with 2 L portions of fresh water then filtered and dried in a vacuum oven at 80° C. for 16 hours. After recrystallization from methyl isobutyl ketone, the product consisted of 111 g of white crystals with a melting point (m.p.) of 192.0° C. to 192.5° C.

PREPARATION OF 4,4'-BIPHENYLDICARBOXYLIC ACID

A 440 g portion of acetic acid, cobalt acetate tetrahydrate (1.25 g, 0.0033 mole), manganese acetate tetrahydrate (1.23 g, 0.0033 mole), potassium bromide (0.6 g, 0.005 mole), potassium acetate (1.48 g, 0.015 mole) and 4,4'-diisopropylbiphenyl (10 g, 0.042 mole) are added to a one-liter stirred titanium autoclave, which is then sealed. The reactor is then heated to 150° C., and 60 psi oxygen is introduced into the reactor to bring the total reactor pressure to about 150 psig. The reactor temperature is then raised to 180° C. and held for one hour. The reactor is then cooled to 50° C. and the carbon dioxide generated from oxidation is vented. The reactor is heated again to 180° C., and oxygen introduced into the reactor and the temperature held for one hour. This procedure is repeated three more times. The reactor is cooled to room temperature and the contents filtered A solid is obtained and washed with water and acetone to yield 9.4 g of a light brown solid, which is identical to 4,4'-biphenyldicarboxylic acid by infrared analysis.

PREPARATION OF 1,4-DIACETOXYBENZENE

The reaction was run in a 1-liter, single neck, round bottom flask equipped with a reflux condenser, nitrogen inlet, heating mantle and magnetic stirrer. Hydroquinone (88.0 g, 0.800 mole) and acetic anhydride (706 g, 6.9 moles) were added to the flask. The reaction mixture was heated to reflux at which time all of the hydroquinone had dissolved. The solution was refluxed for 18 hours, then the volatile portion was removed to yield 191.2 g of crude 1,4-diacetoxybenzene. The crude product was recrystallized from 600 ml of methyl isobutyl ketone. The hot solution was filtered and allowed to cool overnight in a freezer. The clear, colorless crystals were isolated by filtration and dried in a vacuum oven at 75° C. for 4 hours. There remained 39.8 g of 1,4-diacetoxybenzene with a m.p. of 121.5° C. to 122 0° C.

PREPARATION OF 1,4-DIACETOXY-2-METHYLBENZENE

A solution of 1,4-dihydroxy-2-methylbenzene (99.2 g, 0.8 mole) in acetic anhydride (648 g, 6.35 moles) was refluxed in a nitrogen atmosphere for 18 hours. The volatile fraction was removed and the residual oil was dissolved in 400 ml of hot toluene. The solution was diluted with 1 L of hot hexane and cooled in an ice bath. The crystalline solid that separated was recrystallized a second time from a mixture of 280 ml of toluene and 750 ml of hexane to give white crystals with a m.p. of 44.0° C. to 44.5° C.

PREPARATION OF 1,4-BIS(4-ACETOXYBENZOYLOXY)-2-METHYL-BENZENE

An amount of 4-acetoxybenzoic acid (9.0 g, 0.05 mole) and 45 ml of thionyl chloride (74.5 g, 0.63 mole) were refluxed on a steam bath for 4 hours in a 100-ml, single neck, round bottom flask equipped with a reflux condenser, magnetic stir bar and drying tube. The reflux condenser was replaced with a distillation head, condenser and receiver and the excess thionyl chloride was distilled. When the rate of distillation slowed, a vacuum was applied to remove the last traces of unreacted thionyl chloride. The remaining colorless oil was taken up in 180 ml of methylene chloride and the solution was cooled to 5° C. In a one-pint bottle, methylhydroquinone (2.79 g, 22.5 millimoles (mmol)) was quickly dissolved in a solution of sodium hydroxide (2.4 g, 60 mmol) and sodium pyrosulfite (0.19 g, 1 mmol) in 50 ml of water which had been purged with nitrogen. Tetrabutylammonium bromide (0.16 g, 0.5 mmol) was added and the solution was cooled to 5° C. The acid chloride solution in methylene chloride was added and the capped bottle was shaken for 16 hours. The two layers were separated and the lower organic layer was washed with aqueous 1 N hydrochloric acid, a 5 percent solution of sodium bicarbonate and water. The solution was dried over magnesium sulfate and reduced to dryness leaving a white crystalline solid which was recrystallized from 550 ml of methanol. There remained 8.0 g of white crystalline solid with a m.p. of 127.5° C. to 129.5° C.

PREPARATION OF 1,4-BIS(4-ACETOXYBENZOYLOXY)BENZENE

Using the procedure described above, this compound was prepared from hydroquinone and 4-acetoxybenzoic acid. The crude product was recrystallized from methyl isobutyl ketone (18 ml/g) giving white platelets with a m.p. of 185.0° C. to 186.5° C.

EXAMPLE I

PREPARATION OF A COPOLYESTER of 4-HYDROXYBENZOIC ACID, TEREPHTHALIC ACID, 4,4'-BIPHENYLDICARBOXYLIC ACID, HYDROQUINONE AND METHYLHYDROQUINONE

An amount of 1,4-bis(4-acetoxybenzoyloxy)benzene (1.043 g, 2.4 mmol), 1,4-bis(4-acetoxybenzolyloxy)-2-methylbenzene (0.538 g, 1.2 mmol), terephthalic acid (0.299 g, 1.8 mmol), Amoco* TA-33 (Amoco Chemical Company, Chicago, Ill.), and 4,4'-biphenyldicarboxylic acid (0.299 g, 2.4 mmol) were added to a 14 mm diameter glass polymerization tube to become a reaction mass.

The tube was fitted with a head equipped with an adjustable capillary tube, a combination delivery tube and air condenser, a receiver and a combination gas inlet and vacuum port. The polymerization tube was evacuated and refilled with nitrogen three times. The portion of the tube below the joint to which the head was attached was inserted in a small vertical air oven. The reaction mass was heated to 244° C. and became a fluid white slurry. The capillary tube was lowered to a position near the bottom of the tube and a slow stream of nitrogen bubbles was passed through the slurry to mix it. Over the next 194 minutes, the temperature was slowly raised to 360° C. and the slurry became a stiff, opaque tan paste. The capillary tube was raised above the paste and the pressure was slowly lowered to 2 Torr. After an additional 35 minutes, the apparatus was cooled, the vacuum was broken with nitrogen and a copolymer was isolated. The receiver contained 0.35 g of acetic acid. The opaque, light tan polymer was ground to a powder. The copolymer was a copolyester having recurring units of Formulas I, II, III, IV and V in the molar ratio 0.67:0.165:0.165:0.22:0.11, respectively, wherein R and R' are hydrogen and R" is methyl. Its melting point was 320° C. The melt was optically anisotropic as determined by the above mentioned methods.

EXAMPLE II

PREPARATION OF A COPOLYESTER of 4-HYDROXYBENZOIC ACID, TEREPHTHALIC ACID, 4,4'-BIPHENYLDICARBOXYLIC ACID AND METHYLHYDROQUINONE

An amount of 1,4-bis(4-acetoxybenzolyloxy)-2-methylbenzene (1.614 g, 3.6 mmol), terephthalic acid (0.299 g, 1.8 mmol), Amoco* TA-33 (Amoco Chemical Co., Chicago, Ill., and 4,4'-biphenyldicarboxylic acid (0.436 g, 1.8 mmol) were added to a polymerization tube and polymerization was carried out as described in Example I. The resulting copolyester was composed of the recurring units of Formulas I, II, III and V in the molar ratio 0.67:0.165:0.165:0.33, respectively, wherein R and R' are hydrogen and R" is methyl. Its peak melting point was 247° C. on the second heating scan. The melt was optically anisotropic as determined by the above mentioned methods.

EXAMPLE III

PREPARATION OF A COPOLYESTER FROM 4-HYDROXYBENZOIC ACID, TEREPHTHALIC ACID, 4,4'-BIPHENYLDICARBOXYLIC ACID AND HYDROQUINONE

An amount of 1,4-bis(4-acetoxybenzolyloxy)benzene (1.564 g, 3.6 mmol), terephthalic acid (0.299 g, 1.8 mmol), Amoco* TA-33 (Amoco Chemical Company, Chicago, Ill.), and 4,4'-biphenyldicarboxylic acid (0 436 g, 1.8 mmol) were added to a polymerization tube and polymerization was carried out as described in Example I. The resulting copolyester was composed of the recurring units of Formulas I, II, III and V in the mole ratio 0.67:0.165:0.165:0.33, respectively, wherein R and R' are hydrogen. Its peak melting point was 359° C. on the second heating scan. The melt was optically anisotropic as determined by the above mentioned methods.

EXAMPLE IV

PREPARATION OF A COPOLYESTER of 4-HYDROXYBENZOIC ACID, TEREPHTHALIC ACID, 4,4'-BIPHENYLDICARBOXYLIC ACID, HYDROQUINONE AND METHYLHYDROQUINONE

The polymerization was run in a 1 L, single neck, round bottom flask fitted with a two neck adapter upon which were mounted a glass paddle stirrer and a 13 centimeter (cm) Vigreaux distillation column, distillation head with a thermometer, condenser and receiver. An amount of 4-acetoxybenzoic acid (240.1 g, 1.33 moles), terephthalic acid (55.3 g, 0.33 mole) (Amoco* TA-33, Amoco Chemical Company, Chicago, Ill.), 1,4-diacetoxybenzene (66.0 g, 0.34 mole), 1,4-diacetoxy-2-methylbenzene (70.8 g, 0.34 mole) and 4,4'-biphenyldicarboxylic acid (80.7 g, 0.33 mole) were added to the reaction flask. The apparatus was evacuated and refilled with nitrogen three times. The flask was immersed in a molten salt bath preheated to 254° C. When the solid reactants had melted to form a molten reaction mass, stirring was started and the temperature was slowly increased to 361° C. over a 125 minute period at atmospheric pressure. The reaction mass was stirred at 361° C. for an additional 66 minutes. In the next 25 minutes the pressure was reduced to 1 Torr. After an additional 5 minutes, the reaction mass balled up on the stirrer shaft. The vacuum was then released under nitrogen and the reaction vessel was removed from the salt bath. The reaction apparatus was cooled and disassembled. The flask was broken away from an opaque off-white copolymer plug. The plug was sawed into chunks and then ground in a Wiley mill. The copolymer was a copolyester having recurring structural units of Formulas I, II, III, IV and V, wherein R and R' are hydrogen and R" is methyl.

The copolyester had an inherent viscosity of 4.28 dl/g. The peak melting point was 316° C. on the first heating scan as measured by the methods described above. The copolyester was further polymerized in the solid state by tumbling the granular material in a rotating glass vessel at 280° C. and 0.2 Torr for five hours. Its inherent viscosity increased to 5.27 dl/g. The peak melting point was 320° C. on the first heating scan. The copolyester melt was optically anisotropic. Standard 0.125 inch thick test bars were injection molded at a barrel temperature of 340° C., a mold temperature of 93° C. and an injection pressure of 70 bars using a Boy* M-30 Injection Molding Machine (Boy Machines Inc., Exton, Pa.).

A small disk was heated at a rate of 5° C. per minute in the thermal mechanical analyzer described above. A probe 0.025 inches in diameter, carrying a load of 10 g did not begin to penetrate the sample until it was heated to 304° C., indicating that this copolymer maintains its mechanical properties to high temperatures. The mechanical properties are shown in Table I.

TABLE I

| Property | ASTM Test Method | Value |
| --- | --- | --- |
| Flexual Strength | D-790 | 20,900 psi |
| Flexual Modulus | D-790 | 1,690,000 psi |
| Tensile Strength | D-638 | 18,300 psi |
| Tensile Modulus | D-638 | 1,560,000 psi |
| Notched Izod Impact | D-256 | 2.9 ft lb/in |
| Limiting Oxygen Index | D-2863-87 | 37.9% |

What is claimed is:

1. A copolymer capable of forming an optically anisotropic melt consisting essentially of recurring structural units (a) independently selected from the group consisting of Formula I; recurring structural units (b) independently selected from the group consisting of Formula II; recurring structural units (b') independently selected from the group consisting of Formula III; recurring structural units (c) independently selected from the group consisting of Formula IV and optionally recurring structural units (d) independently selected from the group consisting of Formula V:

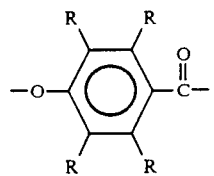

I

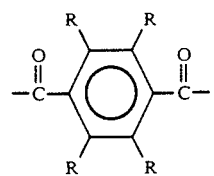

II

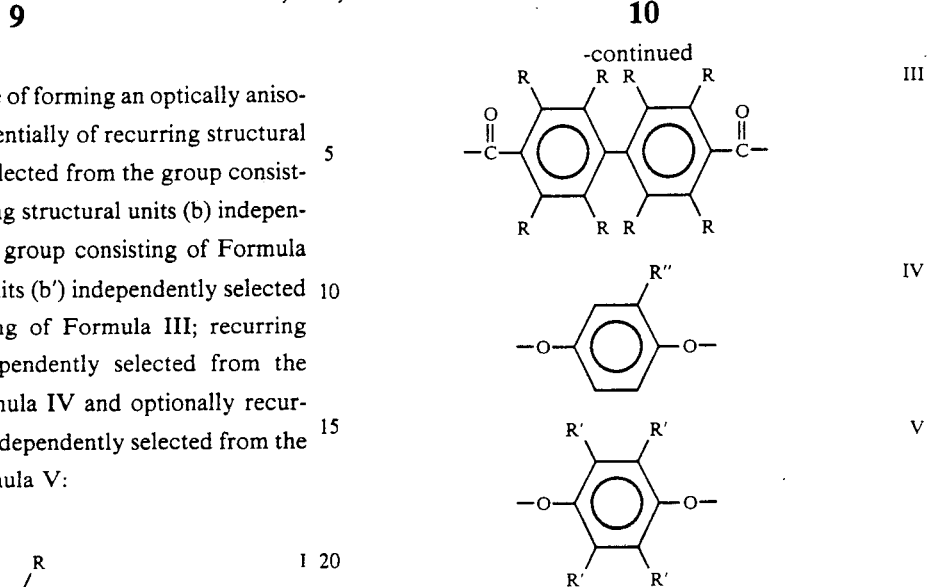

wherein each R is independently selected from the group consisting of hydrogen, halo, lower alkyl, methoxy and phenyl; each R' is independently selected from the group consisting of hydrogen, halo, methoxy and phenyl; and R" is methyl.

2. An injection molded article of the copolymer of claim 1.

3. An oriented fiber of the copolymer of claim 1.

4. A film of the copolymer of claim 1.

5. The copolymer of claim 1 wherein the ratio of structural units (b) of Formula II to structural units (b') of Formula III is from about 10:90 to about 90:10.

* * * * *